United States Patent
Flachsbart et al.

(10) Patent No.: US 11,899,909 B1
(45) Date of Patent: *Feb. 13, 2024

(54) SYSTEM ON BOARD AN ON-ROAD VEHICLE FOR IDENTIFYING, TAGGING AND REPORTING HAZARDOUS DRIVERS IN THE VICINITY OF A HOST VEHICLE

(71) Applicant: UIPCO, LLC, San Antonio, TX (US)

(72) Inventors: Matthew T. Flachsbart, Grapevine, TX (US); Ameer A. Noorani, San Antonio, TX (US); Bradly Jay Billman, Celina, TX (US); Snehal Desai, Richardson, TX (US); Cory Matheson, Celina, TX (US); James Phillip Hillman, Kennewick, WA (US); Andrew L. Anaruk, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/052,163

(22) Filed: Nov. 2, 2022

Related U.S. Application Data

(63) Continuation of application No. 15/889,875, filed on Feb. 6, 2018, now Pat. No. 11,520,460.

(Continued)

(51) Int. Cl.
*G06F 3/0482* (2013.01)
*G06F 3/0484* (2022.01)
(Continued)

(52) U.S. Cl.
CPC .......... *G06F 3/0482* (2013.01); *G06F 3/0484* (2013.01); *G06F 3/167* (2013.01); *G06V 20/625* (2022.01)

(58) Field of Classification Search
None
See application file for complete search history.

(56) References Cited

U.S. PATENT DOCUMENTS

| 7,561,054 B2 | 7/2009 | Raz |
| 7,659,808 B1 | 2/2010 | Cooper |

(Continued)

FOREIGN PATENT DOCUMENTS

| CN | 203786896 U | 8/2014 | |
| CN | 106228812 A | * 12/2016 | ............. G08G 1/017 |
| WO | WO-2017125332 A2 | * 7/2017 | ............ B60W 50/14 |

OTHER PUBLICATIONS

SAE International, "Automated Driving Level of Driving Automation are Defined in New SAE International Standar J3016", 2014, 2 pages (Year: 2014).

(Continued)

*Primary Examiner* — Amelia Vorce
(74) *Attorney, Agent, or Firm* — BakerHostetler

(57) ABSTRACT

The present invention provides a system and method for identifying, tagging and reporting hazardous drivers in the vicinity of a host vehicle. A system comprises a sensor array on the host vehicle for detecting one or more adjacent vehicles in a vicinity of the host vehicle, a host display inside the host vehicle visible to the occupant of the host vehicle, and at least one adjacent vehicle display inside the one or more an adjacent vehicles visible to at least one adjacent vehicle occupant of the one or more adjacent vehicles. A server electronically coupled to the sensor array and the host display is configured to facilitate identification and tagging.

20 Claims, 6 Drawing Sheets

Related U.S. Application Data

(60) Provisional application No. 62/455,312, filed on Feb. 6, 2017.

(51) Int. Cl.
  *G06F 3/16* (2006.01)
  *G06V 20/62* (2022.01)
  *G06V 40/16* (2022.01)

(56) References Cited

U.S. PATENT DOCUMENTS

| | | |
|---|---|---|
| 9,494,938 B1 | 11/2016 | Kemler |
| 10,311,770 B2 | 6/2019 | Ishizuka |
| 2003/0144906 A1 | 7/2003 | Fujimoto |
| 2005/0177421 A1 | 8/2005 | Fujimoto |
| 2009/0172527 A1 | 7/2009 | Buecker |
| 2009/0299857 A1 | 12/2009 | Brubaker |
| 2011/0254655 A1 | 10/2011 | Maalouf |
| 2013/0033386 A1 | 2/2013 | Zlojutro |
| 2013/0211660 A1 | 8/2013 | Mitchell |
| 2015/0178578 A1 | 6/2015 | Hampiholi |
| 2015/0199619 A1 | 7/2015 | Ichinose |
| 2015/0302744 A1 | 10/2015 | Lin |
| 2015/0307107 A1 | 10/2015 | Tamari |
| 2016/0358496 A1 | 12/2016 | McQuade |
| 2017/0036673 A1* | 2/2017 | Lee ................ A61B 5/165 |
| 2017/0115125 A1 | 4/2017 | Outwater |
| 2017/0200197 A1 | 7/2017 | Brubaker |
| 2017/0270788 A1* | 9/2017 | Cain ................ B60W 40/09 |
| 2017/0327037 A1* | 11/2017 | Prakah-Asante ...... H04N 7/183 |
| 2017/0357866 A1 | 12/2017 | Welland |
| 2018/0059416 A1* | 3/2018 | Bhalla ................ B60K 35/00 |
| 2018/0059663 A1 | 3/2018 | Yako |
| 2018/0101736 A1* | 4/2018 | Han ................ G06T 11/60 |
| 2018/0182185 A1 | 6/2018 | Tong |
| 2018/0191510 A1 | 7/2018 | Batten |
| 2018/0204459 A1 | 7/2018 | Bradley |
| 2018/0247527 A1 | 8/2018 | Biehle |
| 2018/0300816 A1 | 10/2018 | Perl |
| 2018/0373267 A1 | 12/2018 | Luo |
| 2019/0043347 A1 | 2/2019 | Biehle |
| 2019/0213429 A1 | 7/2019 | Sicconi |
| 2019/0213931 A1 | 7/2019 | Brubaker |
| 2019/0289126 A1 | 9/2019 | Moir |
| 2020/0058218 A1 | 2/2020 | Julian |

OTHER PUBLICATIONS

"Vigilant Solutions CarDetector Mobile LPR System with Mobile Hit Hunter", Aug. 29, 2012, retrieved from: https://www.policeone.com/police-products/traffic-enforcement/license-plate-readers/videos/vigilant-solutions-cardetector-mobile-lpr-system-with-mobile-hit-hunter-wB2k1 ExjWxj KtTLi/ on Jan. 27, 2020 (Year: 2012).

* cited by examiner

FIG. 1A

SUMMARY OF LEVELS OF DRIVING AUTOMATION FOR ON-ROAD VEHICLES

THIS TABLE SUMMARIZES SAE INTERNATIONAL'S LEVELS OF *DRIVING* AUTOMATION FOR ON-ROAD VEHICLES. INFORMATION REPORT J3016 PROVIDES FULL DEFINITIONS FOR THESE LEVELS AND FOR THE ITALICIZED TERMS USED THEREIN. THE LEVELS ARE DESCRIPTIVE RATHER THAN NORMATIVE AND TECHNICAL RATHER THAN LEGAL. ELEMENTS INDICATE MINIMUM RATHER THAN MAXIMUM CAPABILITIES FOR EACH LEVEL. "SYSTEM" REFERS TO THE DRIVER ASSISTANCE SYSTEM, COMBINATION OF DRIVER ASSISTANCE SYSTEMS, OR *AUTOMATED DRIVING SYSTEM*, AS APPROPRIATE.

THE TABLE ALSO SHOWS HOW SAE'S LEVELS DEFINITIVELY CORRESPOND TO THOSE DEVELOPED BY THE GERMAN FEDERAL HIGHWAY RESEARCH INSTITUTE (BASt) AND APPROXIMATELY CORRESPOND TO THOSE DESCRIBED BY THE US NATIONAL HIGHWAY TRAFFIC SAFETY ADMINISTRATION (NHTSA) IN ITS "PRELIMINARY STATEMENT OF POLICY CONCERNING AUTOMATED VEHICLES" OF MAY 30, 2013.

| LEVEL | NAME | NARRATIVE DEFINITION | EXECUTION OF STEERING AND ACCELERATION/ DECELERATION | MONITORING OF DRIVING ENVIRONMENT | FALLBACK PERFORMANCE OF *DYNAMIC DRIVING TASK* | SYSTEM CAPABILITY (*DRIVING MODES*) | BASt LEVEL | NHTSA LEVEL |
|---|---|---|---|---|---|---|---|---|
| \multicolumn{9}{l}{*HUMAN DRIVER* MONITORS DRIVING ENVIRONMENT} |
| 0 | NO AUTOMATION | THE FULL-TIME PERFORMANCE BY THE *HUMAN DRIVER* OF ALL ASPECTS OF THE *DYNAMIC DRIVING TASK*, EVEN WHEN ENHANCED BY WARNING OR INTERVENTION SYSTEMS | HUMAN DRIVER | HUMAN DRIVER | HUMAN DRIVER | N/A | DRIVER ONLY | 0 |
| 1 | DRIVER ASSISTANCE | THE *DRIVING MODE*-SPECIFIC EXECUTION BY A DRIVER ASSISTANCE SYSTEM OF EITHER STEERING OR ACCELERATION/DECELERATION USING INFORMATION ABOUT THE DRIVING ENVIRONMENT AND WITH THE EXPECTATION THAT THE *HUMAN DRIVER* PERFORM ALL REMAINING ASPECTS OF THE *DYNAMIC DRIVING TASK* | HUMAN DRIVER AND SYSTEM | HUMAN DRIVER | HUMAN DRIVER | SOME DRIVING MODES | ASSISTED | 1 |

FIG. 1B

| | | | | |
|---|---|---|---|---|
| 2 | PARTIAL AUTOMATION | THE *DRIVING MODE*-SPECIFIC EXECUTION BY ONE OR MORE DRIVER ASSISTANCE SYSTEMS OF BOTH STEERING AND ACCELERATION/ DECELERATION USING INFORMATION ABOUT THE DRIVING ENVIRONMENT AND WITH THE EXPECTATION THAT THE *HUMAN DRIVER* PERFORM ALL REMAINING ASPECTS OF THE *DYNAMIC DRIVING TASK* | SYSTEM | HUMAN DRIVER | HUMAN DRIVER | SOME DRIVING MODES | PARTIALLY AUTOMATED | 2 |
| | *AUTOMATED DRIVING SYSTEM ("SYSTEM")* MONITORS THE DRIVING ENVIRONMENT | | | | | | | |
| 3 | CONDITIONAL AUTOMATION | THE *DRIVING MODE*-SPECIFIC PERFORMANCE BY AN *AUTOMATED DRIVING SYSTEM* OF ALL ASPECTS OF THE *DYNAMIC DRIVING TASK* WITH THE EXPECTATION THAT THE *HUMAN DRIVER* WILL RESPOND APPROPRIATELY TO A *REQUEST TO INTERVENE* | SYSTEM | SYSTEM | HUMAN DRIVER | SOME DRIVING MODES | HIGHLY AUTOMATED | 3 |

FIG. 1C

| | | | | | FULLY AUTOMATED |
|---|---|---|---|---|---|
| 4 | HIGH AUTOMATION | THE DRIVING MODE-SPECIFIC PERFORMANCE BY AN AUTOMATED DRIVING SYSTEM OF ALL ASPECTS OF THE DYNAMIC DRIVING TASK, EVEN IF A HUMAN DRIVER DOES NOT RESPOND APPROPRIATELY TO A REQUEST TO INTERVENE | SYSTEM | SYSTEM | SYSTEM | SOME DRIVING MODES |
| 5 | FULL AUTOMATION | THE FULL TIME PERFORMANCE BY AN AUTOMATED DRIVING SYSTEM OF ALL ASPECTS OF THE DYNAMIC DRIVING TASK UNDER ALL ROADWAY AND ENVIRONMENTAL CONDITIONS THAT CAN BE MANAGED BY A HUMAN DRIVER | SYSTEM | SYSTEM | SYSTEM | ALL DRIVING MODES |

SYSTEM ON BOARD AN ON-ROAD VEHICLE FOR IDENTIFYING, TAGGING AND REPORTING HAZARDOUS DRIVERS IN THE VICINITY OF A HOST VEHICLE

CROSS-REFERENCE TO RELATED APPLICATIONS

The present invention is a continuation of and claims priority to U.S. Ser. No. 15/889,875 filed Feb. 6, 2018; and the benefit of U.S. Provisional Patent Application No. 62/455,312 filed Feb. 6, 2017, the contents of which are incorporated herein by reference.

FIELD OF THE INVENTION

The present invention provides a system and method for identifying, tagging and reporting hazardous drivers in the vicinity of a host vehicle.

BACKGROUND

Autonomous driving vehicles are under development by car manufacturers as well as the infrastructure to accommodate them on today's roads. SAE International has developed definitions for six levels of driving automation Levels 0-6 (FIG. 1A, FIG. 1B, and FIG. 1C). Levels 0-2 require a human driver to monitor the driving environment and levels 3-5 require an automated driving system to monitor the driving environment. Vehicles of levels 0-2 are on the road today and have an onboard control system for assisting a driver of a host vehicle in tracking adjacent vehicles. Existing driver assist systems include adaptive cruise control, forward collision warning, lane keeping and lane departure systems, and the like. These systems utilize input from sensors such as RADAR, LIDAR, LASER and optical cameras to track vehicles surrounding the host vehicle. The onboard systems can take measures such as flashing a warning light on the dashboard, side-view or rear-view mirrors, or other display and by applying brakes to slow or stop the host vehicle.

Vehicles of levels 3-5 are being tested on today's roads but are not available for purchase by the general public on a large scale in the United States. These vehicles will be taking to the road in the near future and must be capable of navigating safely through streets with other vehicles of varying levels of automation. Federal, state, and local governments, and other entities, have equipped and will further equip and implement a centralized traffic resource for monitoring road conditions, transmitting signals representative of the road conditions for highways, surface roads and other thoroughfares traveled by on-road vehicles like cars, trucks, motorcycles, and other vehicles. The centralized traffic resource will have inputs from numerous sources such as GPS, in-road impact sensors, and other sensors for sensing the speed, direction and volume of on-road vehicles. The centralized traffic resource will also have input from sensors for detecting the ambient conditions such as weather conditions and for reporting these conditions to entities equipped to receive the signal. The centralized traffic resource will be equipped to receive and transmit signals received from vehicles in a vicinity warning of a vehicle being driven unlawfully, unsafely or erratically.

The present invention is directed to a system on-board a host vehicle for an occupant of the host vehicle to identify, tag, and report a vehicle being driven in an unlawful, unsafe or erratic manner to the central traffic resource and to vehicles in the vicinity of the host vehicle that are similarly equipped to receive and use such information.

SUMMARY OF THE INVENTION

The present invention provides an electronic system onboard a host vehicle to allow an occupant to identify, tag and report hazardous drivers in the vicinity of the host vehicle. In an embodiment, a system comprises a sensor array on the host vehicle for detecting one or more adjacent vehicles in a vicinity of the host vehicle; a host display inside the host vehicle visible to the occupant of the host vehicle; at least one adjacent vehicle display inside the one or more an adjacent vehicles visible to at least one adjacent vehicle occupant of the one or more adjacent vehicles; a signal transmitter on the host vehicle; and a server electronically coupled to the sensor array, the host display, and the signal transmitter and having a processor, a memory storing computer-readable instructions.

In an embodiment, a system is configured to perform a method comprising, or a method can comprise: providing a graphical user interface (GUI) shown on the host display; preparing an image of road conditions in the vicinity from input from the sensor array and displaying the road image including the one or more adjacent vehicles on the host display; providing a selector in the GUI for manipulation by the occupant of the host vehicle for placing a visible emphasis on the one or more adjacent vehicles in the road image; providing a menu of options with the GUI for the occupant of the host vehicle to select within the road image the one or more adjacent vehicles and to place a visible emphasis on the one or more adjacent vehicles to define at least one tag respectively associated with at least one pre-tagged vehicle, wherein the at least one tag has an expiration; determining that the at least one tag does not exceed a limit of tags that can be issued for the host vehicle over a period of time; providing with the GUI a field for the occupant of the host vehicle to enter or select a tag type from a menu of tag types for the at least one tag; associating respective tag information with the at least one tag, wherein the respective tag information includes a time, date, geographical location, and the identity of the occupant of the host vehicle; transmitting, by the signal transmitter on the host vehicle, a signal representative of the tag type to a receiver on the at least one pre-tagged vehicle to define at least one tagged vehicle; and transmitting a signal representative of the at least one tag to the at least one adjacent vehicle display, wherein the at least one adjacent vehicle display is configured to display the tag type over an image of the pre-tagged vehicle in the road image.

The foregoing summary is intended to provide only example details, and should not be interpreted to limit any other portion of the disclosure or claims.

BRIEF DESCRIPTION OF THE DRAWINGS

To understand the present invention, it will now be described by way of example, with reference to the accompanying drawings in which:

FIG. 1A, FIG. 1B, and FIG. 1C are a table entitled a Summary of Levels of Driving Automation for On-road Vehicles.

DETAILED DESCRIPTION

Figure 2:
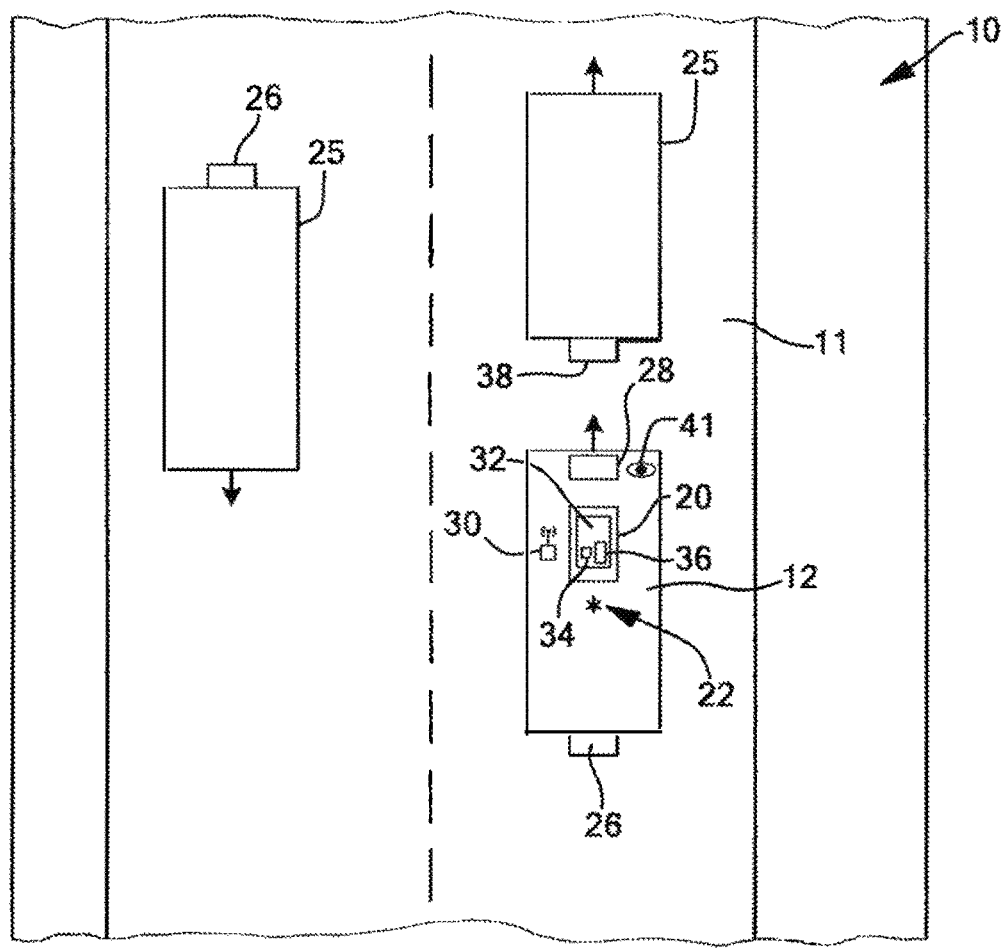
FIG. 2 is a schematic representation of a system of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1A, FIG. 1B, and FIG. 1C show a Summary of Levels of Driving Automation for On-Road Vehicles. In levels 0-2 a human operator is responsible for monitoring the driving environment conditions. In levels 3-5, an automated driving system monitors the road conditions. The present invention provides a system onboard a host vehicle, more preferably for host vehicles of SAE levels 1-5, allowing an occupant of the host vehicle to identify, tag and report a vehicle in the vicinity of the host vehicle that is being driven unlawfully, erratically or recklessly, for example.

FIG. 2 shows a display 10 representative of traffic conditions on a two-way divided street 11 in a vicinity of a host vehicle 12. The host vehicle has an onboard electronic system 20 to allow an occupant to identify, tag and report hazardous drivers in the vicinity of the host vehicle. The system includes a sensor array 22 on the host vehicle for detecting the presence of other vehicles 25 in the vicinity of the host vehicle. The system also has a first display 26 on the host vehicle visible from outside the host vehicle, a second display 28 inside the host vehicle visible to an occupant of the host vehicle, and a signal transmitter 30. The system has a server 32 electronically coupled to the sensor array 22, the first display 26, the second display 28 and the signal transmitter 30 and having a processor 34, and a memory 36 storing computer-readable instructions when executed by the processor takes the steps shown in the methods described below in reference to FIGS. 6 and 7.

Figure 3:
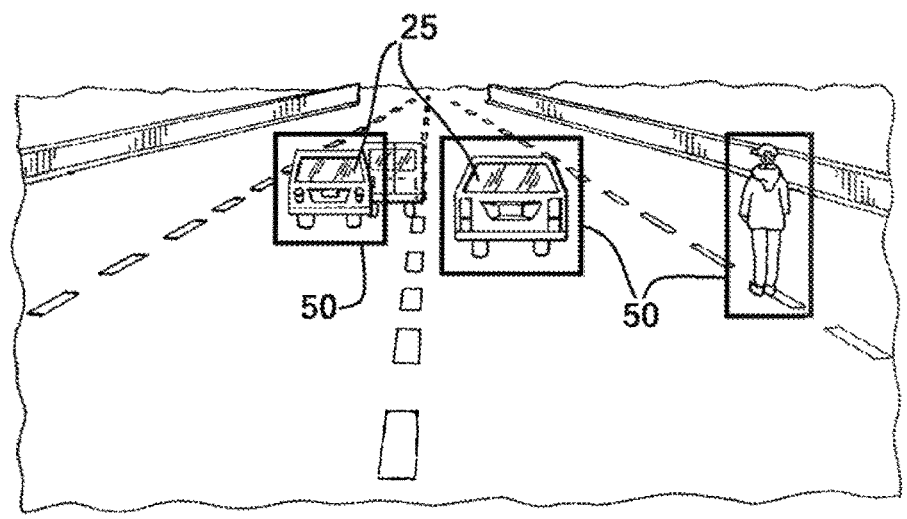
FIG. 3 is a display showing traffic conditions on a road having 4 lanes in a single direction with emphasis applied to certain vehicles.
Figure 4:
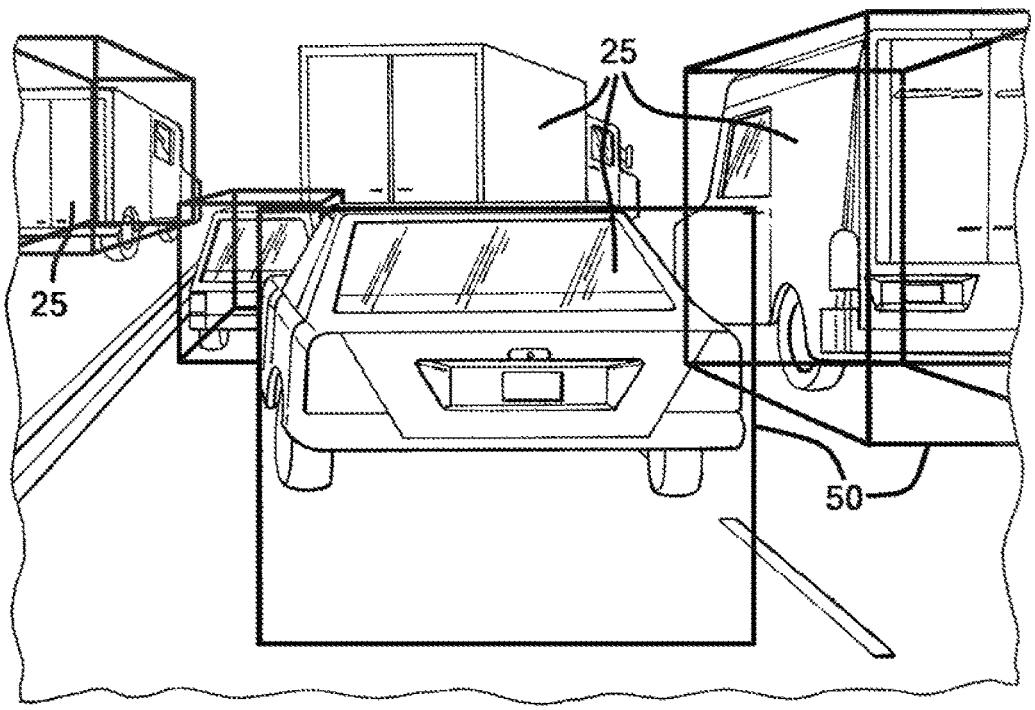
FIG. 4 is a display showing traffic conditions on a 4-lane, two-direction divided road.
Figure 5:
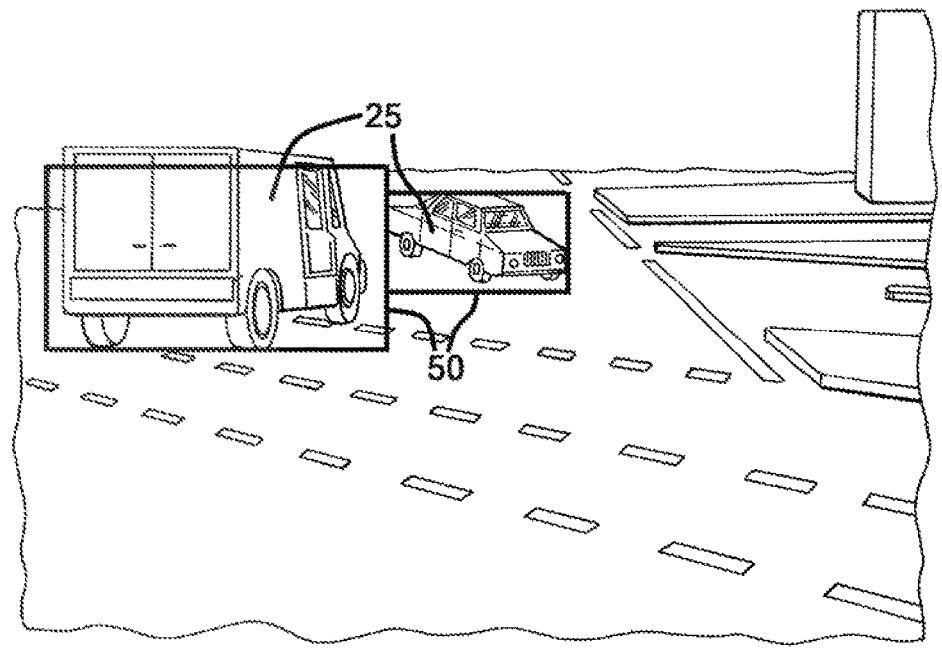
FIG. 5 is a display showing vehicles in the vicinity of an intersection of two transverse roads.

The software provides a graphical user interface (GUI) that is displayed for viewing by an occupant on the second display 28. FIG. 2 shows a representation of road conditions in the vicinity of the host vehicle 12 prepared using the processor from input from the sensor array 22. The sensor array can include at least one of, or a combination of any and all, a RADAR, a LIDAR, a LASER, an accelerometer, and a camera. The software will also support a selector for placing a visible emphasis 50 (see FIGS. 3-5) on one or more of the adjacent vehicles 25 in the road image. The selector is implemented by a data entry device such as a mouse, a keypad, a virtual keypad, a cursor control system responsive to audible commands, and combinations of the same to allow an occupant to move the emphasis over adjacent vehicles in the road image.

The software also supports a menu system in the GUI to provide options to take with respect to an emphasized vehicle including the step of "tagging" the vehicle. The term "tagging" refers to transmitting a signal to a third display 38 on an adjacent vehicle, and viewable from outside the adjacent vehicle, to indicate the tagged vehicle is being operated in a manner that is unlawful, erratic, or unsafe, for example. The third display is attached preferably to a rear portion of the tagged vehicle, and even more preferable in the area of the license plate, and even more preferably in an area circumjacent the license plate. The third display could be part of a license plate frame for example. It is contemplated that an adjacent vehicle can be tagged for a variety of reasons outside of these few mentioned without departing from the scope of the present invention.

The GUI can provide a menu for an occupant to select a tag type from a variety of tag types and to authorize transmission of the tag to a receiver on a pre-tagged vehicle. Upon receipt, the tag is displayed on the third display 38 to define a tagged vehicle. The system records identifying information associated with the tag, such as the time, date, geographical location of when and where the tag was applied, and an identity of an entity sending the tag. The tag and the identifying information can be transmitted to the tagged vehicle, to adjacent vehicles similarly equipped to display such tagged vehicles, and to a central traffic authority. The tag distribution can be defined by a user of the system or can be pre-set by convention or law. The tag can have an expiration date set by convention or law so that it is in not necessarily permanent, but could be. The system can also include safeguards to prevent a tagging entity from abusive or inappropriate tagging of vehicles. Thus, the system may limit the number of tags that can be issued per vehicle over a specified period of time as one example of such safeguard.

The system further includes a scanner 41 in the sensor array and operated in accordance with a method described below with respect to FIG. 7. The scanner 41 is for scanning adjacent vehicles to locate those vehicles that have been previously tagged, and to display the tag type and any identifying information in association with the image of tagged vehicle in the road image. In one form of the invention, the scanner will also collect an electronic image of a license plate on a tagged vehicle and using optical character recognition determine a textual form of the license plate number. The license plate information can be included in the identifying information mentioned above associated with the tag.

The signal representative of the tag can also be transmitted to a telematics system onboard the host vehicle. The host vehicle will typically have a level of automation from 1 to 5 on the SAE scale of on-road vehicle automation shown in FIG. 1A, FIG. 1B, and FIG. 1C.

In a preferred form of the invention, the system further includes a dictation module in the date entry device for receiving oral dictation of a license plate number. The system can also require the person tagging to identify themselves by entering their name into a field in the GUI or by inserting a key or other device into a receptacle in the host vehicle where the identity can be scanned.

Figure 6:
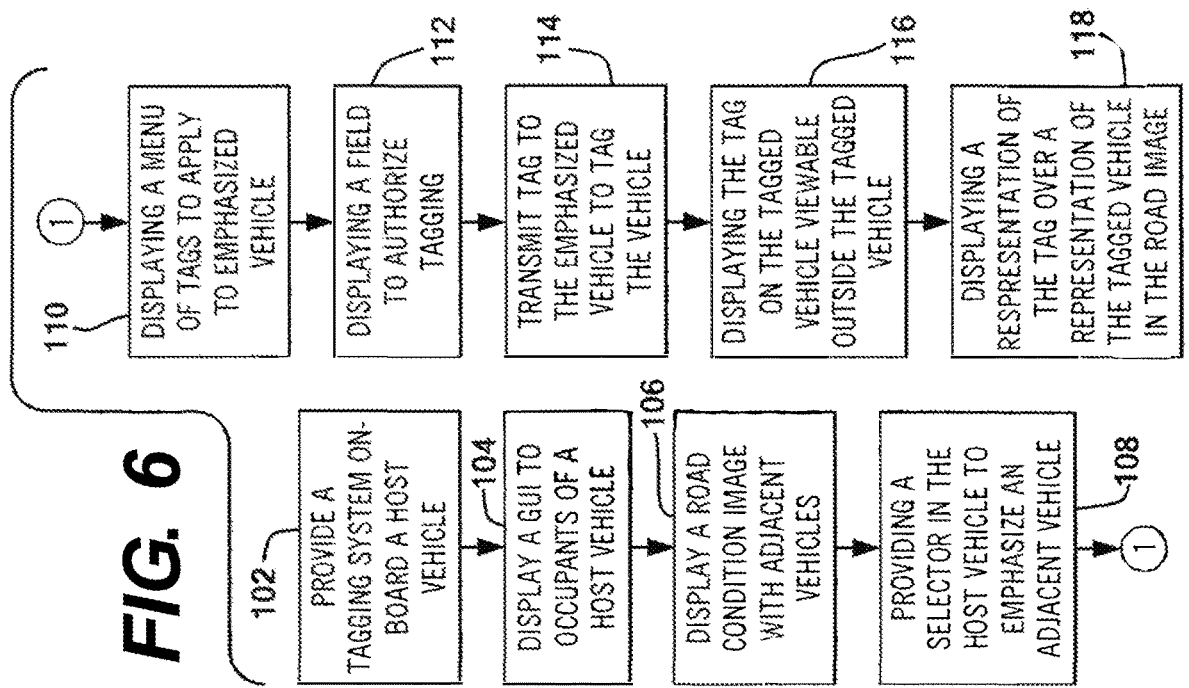
FIG. 6 is a flowchart of a method of the present invention for tagging a vehicle.

FIG. 6 shows a method 100 for an occupant of a host vehicle using the system described above to tag a vehicle. In step 102 the tagging system is provided onboard the host vehicle. In step 104, the GUI is displayed to the occupant of the host vehicle showing a road image representative of the road conditions including adjacent vehicles in the vicinity of the host vehicle 106. The GUI provides a selector 108 to designate an adjacent vehicle in the image and to apply emphasis to define an emphasized vehicle. The GUI displays a menu 110 of tag types to apply to the emphasized vehicle. The GUI provides a data field 112 for an occupant to authorize the tagging of the emphasized vehicle to define a pre-tagged vehicle. Upon authorization, the signal transmitter transmits a signal representative of the tag type to a receiver on the pre-tagged vehicle. Transmitting a signal 116 using the signal transmitter to a receiver on the pre-tagged vehicle to define a tagged vehicle 114. Displaying on the third display 116 indicia representative of the tag type for viewing from outside the tagged vehicle 116. In step 118, the system displays indicia of the tag type over the image of the tagged vehicle in the road image displayed on the second display in the host vehicle.

Figure 7:
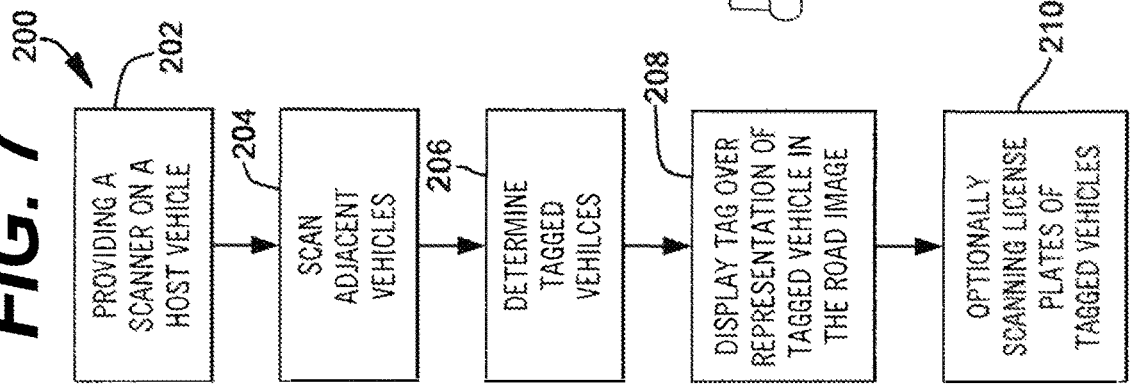
FIG. 7 is a flowchart of a method of scanning for tagged vehicles.

FIG. 7 shows a second method 200 of using the scanner in step 202 on the host vehicle for scanning 204 adjacent vehicles for tags. Determine the tag type and any identifying information associated with the tag in step 206. In step 208, indicia representative of the tag is displayed over the tagged vehicle in the road image and any identifying information is displayed therewith. In an optional step 210, the scanner also determines the license plate number of the tagged vehicle and the license plate number is displayed as part of the identifying information.

Figure 8:
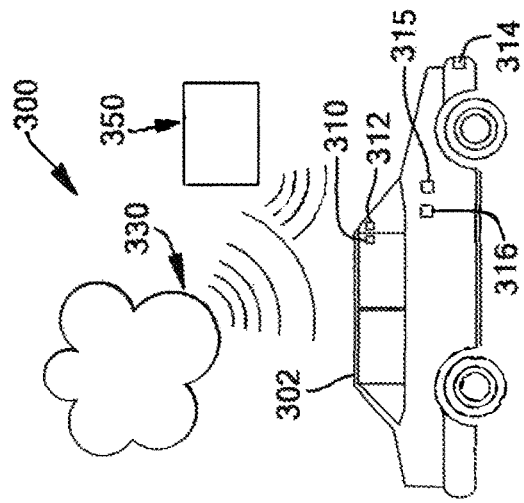
FIG. 8 is a schematic representation of a system for generating a driver score.

FIG. 8 shows a system 300 for generating a driver's score in real time. The driver's score is a numerical representation of the safety of a driver relative to a scale developed for this purpose and based on data gathered through sensors on a host vehicle 302. The score can be generated in real-time and recorded over time for statistical analyses. The real-time score can be displayed and transmitted for immediate use. One example is if a driver score falls below a threshold value for a prescribed period of time results in the host vehicle sending an alert to law enforcement officials. The real-time driver score can also be used for accident cause and liability determinations. The threshold values and periods can be determined with longer-term data that has been collected. These are just a few examples of how a real-time or short-term driver score data can be utilized but the invention should not be so limited.

Real-time data collected, aggregated and statistically analyzed over time can yield a long-term driver score. The long-term driver score can be used for setting insurance rates, hiring of drivers, hiring employees, rating a livery driver on social media, determining how a teenager drove his parents' car, determining how a car-renter has driven a rental vehicle, and numerous other purposes that occurs to those of ordinary skill in the art. A long-term period is one that can last from say about 5 seconds to 3 years, and include activities such as a trip to the store and back.

Relative scales are ubiquitous on the Internet, social media, and elsewhere. One example of a scale is using a number from 1 to 10 with 1 being on the low end of the safety scale and 10 being on the high end of the safety scale, for example. Calculating a driver's score will take into consideration a driver's behavior and the operating parameters of the vehicle, weather conditions, road conditions, among other possible parameters. A driver's behavior includes alertness, reaction time, vital signs, appropriate eye focus, appropriate use of: mirrors, speed control, acceleration, braking, and lanes.

The host vehicle 302 has an array of sensors for use in calculating a driver's score. For example, the host vehicle has a forward facing camera 310, a driver-facing camera 312, a radar 314, a communicator 315 for receiving and transmitting electronic signals representative of the driver's score (or the date needed to calculate the driver's score), and a standard telematics system and sensor array 316. Data from these sensors can be sent to a central location, such as to the telematics sensor system 316 for collection and use, or to the transmitter for transmittal to a desired address through a communication network 330. The communication network includes the Internet, cellular communication, and land-lines as is well known in the art.

The standard telematics system 316 includes inputs from GPS, vehicle diagnostics, an accelerometer, and a 3D radar camera 314, for example. The driver-facing camera 312 captures data to determine eye tracking/movement, face detection and recognition, and head tracking for example. Environmental data can also be gathered such as weather, location, road congestion, date and time, and vehicle condition. The telematics system can also have a controller having processor and a memory storing instructions when implemented by the processor calculates the driver's score and can also output: reaction time of a driver, weather conditions, who is the driver, is the driver paying attention or distracted, how close does the driver follows vehicles in front of them, and speed of the vehicle for example. The telematics system can also generate and transmit a signal to an inspection partner 350 who can use the data for any purpose including the vehicle condition for diagnosis and troubleshooting purposes and repair. The identity of the driver can be determined using facial recognition, biometric input (fingerprint, iris, e.g.), data input by the driver using a data input device, or the use by the driver of a token or key that stores an electronic representation of the identity of the driver.

Many modifications and variations of the present invention are possible in light of the above teachings. It is, therefore, to be understood within the scope of the appended claims the invention may be protected otherwise than as specifically described.

We claim:

1. An electronic system onboard a host vehicle to allow an occupant to identify, tag and report hazardous drivers in the vicinity of the host vehicle comprising:
   a sensor array on the host vehicle for detecting one or more adjacent vehicles in a vicinity of the host vehicle;
   a host display inside the host vehicle visible to the occupant of the host vehicle;
   at least one adjacent vehicle display inside the one or more an adjacent vehicles visible to at least one adjacent vehicle occupant of the one or more adjacent vehicles;
   a signal transmitter on the host vehicle;
   a server electronically coupled to the sensor array, the host display, and the signal transmitter and having a processor, a memory storing computer-readable instructions when executed by the processor takes the following steps:
   providing a graphical user interface (GUI) shown on the host display;
   preparing an image of road conditions in the vicinity from input from the sensor array and displaying the road image including the one or more adjacent vehicles on the host display;
   providing a selector in the GUI for manipulation by the occupant of the host vehicle for placing a visible emphasis on the one or more adjacent vehicles in the road image;
   providing a menu of options with the GUI for the occupant of the host vehicle to select within the road image the one or more adjacent vehicles and to place a visible emphasis on the one or more adjacent vehicles to define at least one tag respectively associated with at least one pre-tagged vehicle, wherein the at least one tag has an expiration;

determining that the at least one tag does not exceed a limit of tags that can be issued for the host vehicle over a period of time;

providing with the GUI a field for the occupant of the host vehicle to enter or select a tag type from a menu of tag types for the at least one tag;

associating respective tag information with the at least one tag, wherein the respective tag information includes a time, date, geographical location, and the identity of the occupant of the host vehicle; and transmitting, by the signal transmitter on the host vehicle, a signal representative of the tag type to a receiver on the at least one pre-tagged vehicle to define at least one tagged vehicle, wherein the at least one adjacent vehicle display displays the tag type over an image of the pre-tagged vehicle in the road image.

2. The system of claim 1, further comprising the step of providing a scanner in the sensor array for scanning adjacent vehicles to detect tagged vehicles.

3. The system of claim 2, further comprising the step of reading a license plate number of the one or more adjacent vehicles with the scanner.

4. The system of claim 1, further comprising the step of associating a visible indicia of the tag type in the road image over the at least one tagged vehicle in the host display.

5. The system of claim 1, wherein the step of transmitting further comprises:

transmitting, by the signal transmitter on the host vehicle to the receiver on the at least one pre-tagged vehicle, the tag information.

6. The system of claim 1, wherein the step of transmitting the signal representative of the tag further comprises transmitting the signal to a traffic resource.

7. The system of claim 6, wherein the step of transmitting the signal representative of the tag type further comprises transmitting the signal to a telematics system onboard the host vehicle.

8. The system of claim 1, wherein the host vehicle comprises a level of automation from 1 to 5 on the SAE scale of on-road vehicle automation.

9. The system of claim 1, comprising a rear display electronically coupled to the server and positioned on a rear of the host vehicle.

10. The system of claim 9, wherein the rear display is positioned proximate a license plate on the host vehicle.

11. The system of claim 10, further comprising the step of using optical character recognition to determine a license plate number associated with the one or more adjacent vehicles.

12. The system of claim 11, wherein the step of transmitting the signal representative of the tag type further comprises transmitting the license plate number to a traffic resource.

13. The system of claim 1, wherein the sensor array comprises at least one of a RADAR, a LIDAR, a LASER, an accelerometer, or a camera.

14. The system of claim 1, wherein the host vehicle comprises an onboard system for piloting the host vehicle.

15. The system of claim 14, further comprising the step of piloting the host vehicle with the onboard system.

16. The system of claim 1, wherein the selector comprises a data entry device.

17. The system of claim 16, further comprising a dictation module in the data entry device for receiving oral dictation of a license plate number.

18. The system of claim 1, wherein the host vehicle comprises a receptacle for a key identifying a driver of the vehicle.

19. The system of claim 1, wherein the tag types comprise at least one of: the at least one tagged vehicle is being driven in a manner that is unlawful.

20. The system of claim 1, wherein the instructions when executed by the processor take the following step:

determining that the at least one tag is not abusive.

\* \* \* \* \*